(No Model.)
W. H. HARRIS.
Filter Press.
No. 237,525. Patented Feb. 8, 1881.
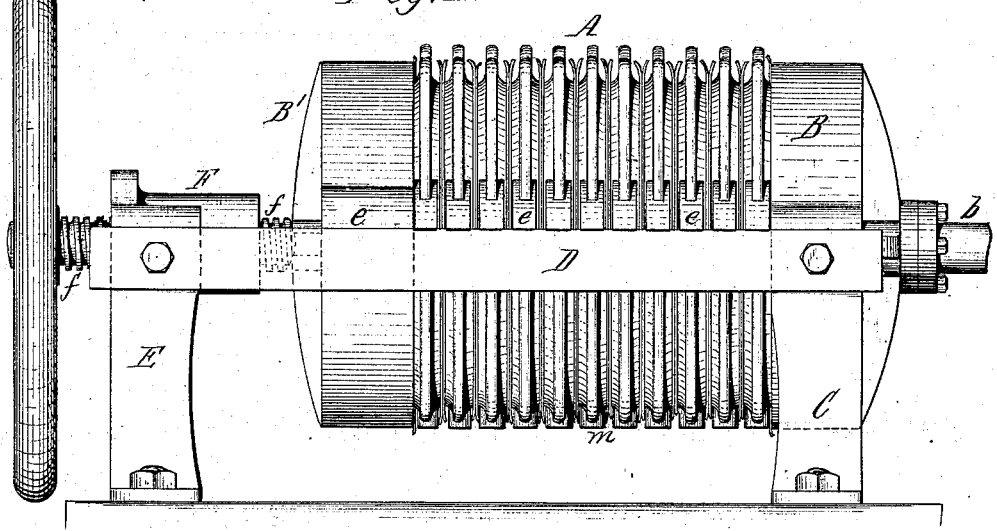
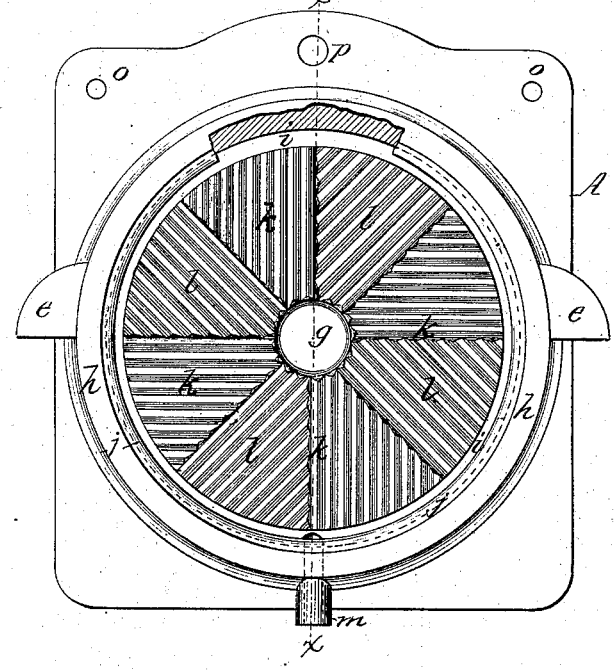
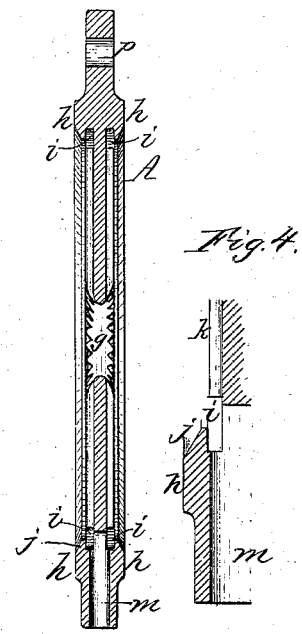
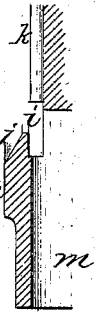
Witnesses:
Chas. J. Buchheit
Edw. J. Brady
Inventor:
W. H. Harris
By Wilhelm & Bonner
Attorneys.

United States Patent Office.

WILLIAM H. HARRIS, OF BUFFALO, NEW YORK.

FILTER-PRESS.

SPECIFICATION forming part of Letters Patent No. 237,525, dated February 8, 1881.

Application filed November 9, 1880. (No model.)

*To all whom it may concern:*

Be it known that I, WILLIAM H. HARRIS, of the city of Buffalo, in the county of Erie and State of New York, have invented a new and useful Improvement in Filter-Presses, of which the following is a specification, reference being had to the accompanying drawings.

This invention relates to that class of filters which are designed for filtering under pressure saccharine solutions and other liquids containing solid impurities, and more particularly to filters of this class which are composed of a series of filter-plates provided with a central passage for the liquid to be filtered, and grooves or corrugations covered with cloths, through which the filtrate is pressed into the grooves.

The object of my invention is to so construct these filter-plates as to enable the filtrate to be more readily collected and discharged; and it consists of the particular construction of the filter-plates, as will be hereinafter fully described.

In the accompanying drawings, Figure 1 represents a side elevation of a filter-press provided with my improvements. Fig. 2 is an elevation of one of my improved filter-plates on an enlarged scale. Fig. 3 is a cross-section in line $x\,x$, Fig. 2. Fig. 4 is a fragmentary sectional view of the outer portion of a filter-plate on an enlarged scale.

Like letters of reference refer to like parts in the several figures.

A represents the filter-plates arranged in face-to-face contact with each other, and B B' the end plates arranged against the outer sides of the first and last filter-plate, respectively. The end plate, B, is provided with a central bore, to which is connected a pipe, $b$, by which the liquid to be filtered is supplied to the filter. The end plate, B, is furthermore provided with legs C, which are bolted to a suitable bed-plate. D are side bars bolted to the end plate, B, and connected, with their opposite ends, to a standard or frame, E, which is bolted to the same bed-plate. The filter-plates A and the end plate B' are provided with laterally-projecting lugs or ears, $e$, by which these plates rest upon the side bars, D.

F represents a screw-box secured to the frame E in line with the axis of the filter-plates, and $f$ is a screw working in the box F and bearing against the end plate, B', whereby the plates constituting the filter are firmly pressed together.

The filter-plates A are each provided with a central opening, $g$, and the several openings in these filter-plates form a central passage through the entire filter, through which the liquid to be filtered passes from the pipe $b$ to all the filtering-surfaces.

$h$ is an annular bearing-surface surrounding the filtering-surface on each plate, and coming in contact with the corresponding bearing-surface of the contiguous filter-plate, whereby a tight joint is formed between the different filter-plates.

$i$ is an annular groove or depression formed on each face of the filter-plate at the inner side of the annular bearing-surface $h$, and $j$ is an inwardly-projecting tapering flange which separates the groove $i$ from the bearing-surface $h$.

$k$ represents grooves formed in alternate sectors of the plate, the longest groove being in a radial line and the balance and shorter ones parallel thereto. These grooves, at their outer ends, terminate in the annular groove or channel $i$. $l$ are grooves in the intermediate sectors of the plates, having the initial or longest groove arranged radially and the shorter ones parallel therewith and terminating in the channel $i$ in the same way as the grooves $k$, but so arranged that if extended they would intersect the grooves $k$, as clearly shown at Fig. 2.

$m$ represents the discharge-passage for the filtrate formed in the lower part of each filter-plate, and communicating with the two annular grooves, $i$, on the two faces of each filter-plate. The corrugated filtering-surfaces are covered on each side of the filter-plate with a circular filter-cloth having a central opening, and the two filter-cloths on both sides of the same plate are firmly connected at the center by a metallic thimble in the usual manner. The outer edges of the filter-cloths are clamped between the bearing-surfaces $h$ of the filter-plates.

The liquid to be filtered enters between the filtering-surfaces through the central passages $g$, and the liquid is forced through the filter-cloth while the solid impurities remain between the filter-cloths. The filtrate, as it is forced through the cloth, is received in the grooves *k l* and conducted by the same directly to the annular groove *i*, into which the outer ends of these grooves open. The filtrate is collected in the groove *i* from all of the grooves *k l*, and conducted by the groove *i* directly to the discharge-passage *m*, the flange *j* forming a wall which prevents the liquid from escaping from the groove *i* except by the discharge-passage *m*. In this manner the filtrate is readily collected and discharged from the filtering-surfaces, and a free and uninterrupted flow of the filtrate insured. The filter-plates are preferably provided on each side with openings *o*, to which the filter-cloths are fastened, and a central opening, *p*, in which the hook of a lifting apparatus is engaged in removing or replacing the plates.

I claim as my invention, and desire to secure by Letters Patent—

1. A filter-plate having a central opening, *g*, for the admission of the liquid to be filtered, an annular depression or groove, *i*, for the collection of the filtrate, a discharge-passage, *m*, communicating with the annular groove *i*, and grooves *k* and *l*, arranged, as described, in alternate sectors, and discharging into the groove *i*, substantially as set forth.

2. A filter-plate having a central opening, *g*, an annular bearing-surface, *h*, a flange, *j*, arranged between the bearing-surface *h* and the inner periphery of the groove *i*, and tapered inwardly far enough to form a wall, and grooves *k l*, all arranged as and for the purposes described.

WM. H. HARRIS.

Witnesses:
JNO. J. BONNER,
EDW. J. BRADY.